United States Patent
Booker et al.

(10) Patent No.: US 9,397,767 B2
(45) Date of Patent: Jul. 19, 2016

(54) METHOD OF CONTROLLING NOISE RISE IN A CELL

(75) Inventors: Philip Booker, Southampton (GB); Volker Breuer, Botzow (DE); Thomas Malcolm Chapman, Southampton (GB); Joern Krause, Berlin (DE); Frank Lamprecht, Berlin (DE)

(73) Assignee: Nokia Solutions and Networks GmbH & Co. KG, Munich (DE)

( * ) Notice: Subject to any disclaimer, the term of this patent is extended or adjusted under 35 U.S.C. 154(b) by 1571 days.

(21) Appl. No.: 11/919,499

(22) PCT Filed: Apr. 24, 2006

(86) PCT No.: PCT/GB2006/001478
§ 371 (c)(1),
(2), (4) Date: Jul. 14, 2011

(87) PCT Pub. No.: WO2006/114590
PCT Pub. Date: Nov. 2, 2006

(65) Prior Publication Data
US 2012/0172074 A1    Jul. 5, 2012

(30) Foreign Application Priority Data
Apr. 28, 2005  (GB) .................................. 0508577.4

(51) Int. Cl.
*H04B 17/00* (2015.01)
*H04B 17/309* (2015.01)

(52) U.S. Cl.
CPC .................................... *H04B 17/309* (2015.01)

(58) Field of Classification Search
None
See application file for complete search history.

(56) References Cited

U.S. PATENT DOCUMENTS

| 2,336,627 A * | 12/1943 | Mouradian .................... 370/201 |
| 5,799,243 A * | 8/1998 | Ojaniemi ..................... 455/63.1 |
| 6,675,004 B1 | 1/2004 | Waylett |
| 2001/0028638 A1* | 10/2001 | Walton et al. .................. 370/335 |
| 2002/0034169 A1* | 3/2002 | Ozluturk et al. ............... 370/335 |
| 2002/0080719 A1* | 6/2002 | Parkvall et al. ................ 370/235 |
| 2002/0119805 A1* | 8/2002 | Smith ........................... 455/561 |
| 2002/0183064 A1* | 12/2002 | Gopalakrishnan et al. ... 455/452 |
| 2003/0161343 A1* | 8/2003 | Ghosh ............... H04W 72/1226 370/465 |
| 2004/0165559 A1 | 8/2004 | Kwak et al. |
| 2004/0185868 A1 | 9/2004 | Jain et al. |
| 2004/0198369 A1* | 10/2004 | Kwak ................... H04W 28/22 455/452.2 |
| 2004/0219920 A1* | 11/2004 | Love et al. ..................... 455/442 |
| 2005/0013283 A1 | 1/2005 | Yoon et al. |

(Continued)

OTHER PUBLICATIONS

International Search Report for Application No. PCT/GB2006/001478; mailed Jul. 17, 2006.

(Continued)

*Primary Examiner* — Zhiyu Lu

(57) ABSTRACT

After a maximum noise rise for a cell is set, a maximum noise rise for each mobile station is allocated within the cell. The actual noise rise from each mobile station within the cell is measured at a base station and signaled to a network. When the cell uses enhanced dedicated channel (E-DCH), the contribution to noise rise of E-DCH signaling is determined and received signal code power (RSCP) at the base station is measured. The RSCP measurement is decoded to determine contributions from mobile stations within and outside the cell; contributions from mobile stations within the cell are calculated; and the network is notified of the measured noise rise. In addition a compensation value may be applied to compensate for temperature induced noise.

16 Claims, 2 Drawing Sheets

(56) References Cited

U.S. PATENT DOCUMENTS

| | | | |
|---|---|---|---|
| 2005/0025100 A1* | 2/2005 | Lee | H04W 72/1257 370/335 |
| 2005/0043062 A1 | 2/2005 | Ahn et al. | |
| 2005/0079865 A1 | 4/2005 | Ahn et al. | |
| 2005/0207359 A1* | 9/2005 | Hwang | H04W 36/0055 370/278 |
| 2005/0220042 A1* | 10/2005 | Chang | H04L 1/0072 370/278 |
| 2005/0220116 A1* | 10/2005 | Ahn | H04W 72/14 370/395.4 |
| 2005/0249163 A1* | 11/2005 | Kim et al. | 370/335 |
| 2005/0250511 A1* | 11/2005 | Xiao et al. | 455/453 |
| 2006/0135189 A1* | 6/2006 | Nagaraj | H04B 17/318 455/513 |
| 2007/0207814 A1* | 9/2007 | Usuda et al. | 455/455 |
| 2013/0215830 A1* | 8/2013 | Lohr et al. | 370/328 |
| 2014/0064224 A1* | 3/2014 | Kuroda et al. | 370/329 |

OTHER PUBLICATIONS

Unitted Kingdom Search Report for Application No. GB0508577.4; dated Nov. 3, 2005.

Further Search Report from the Patent Office of the United Kingdom dated Mar. 10, 2006 for corresponding UK patent application 0508577.4.

\* cited by examiner

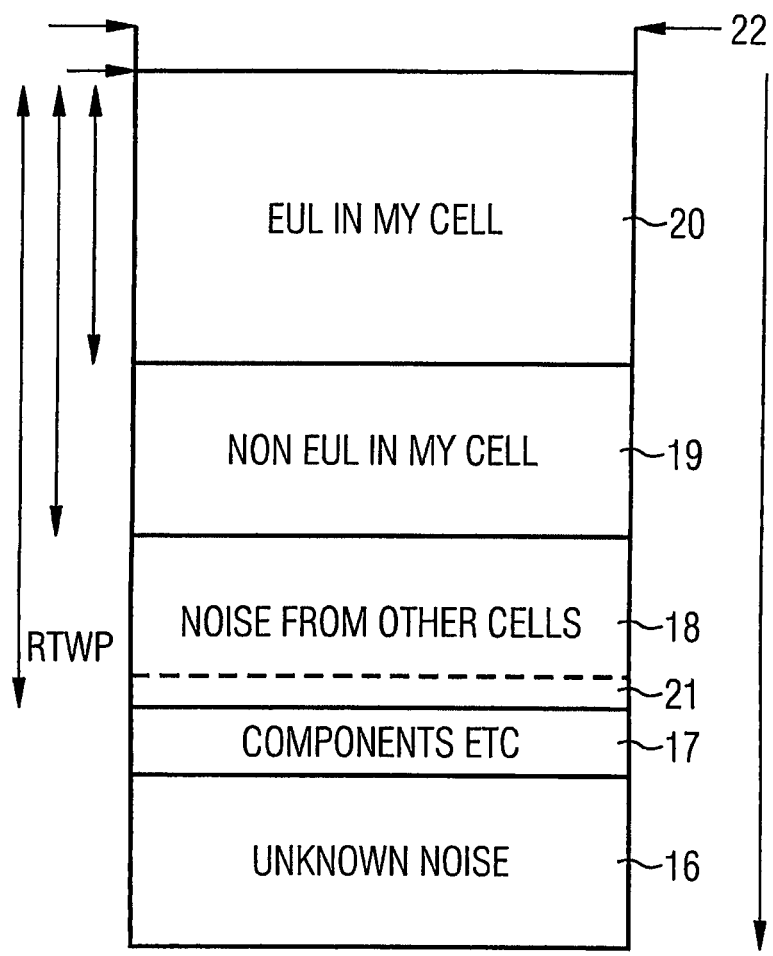

METHOD OF CONTROLLING NOISE RISE IN A CELL

CROSS REFERENCE TO RELATED APPLICATIONS

This application is based on and hereby claims priority to United Kingdom Application No. 0508577.4 filed on Apr. 28, 2005, the contents of which are hereby incorporated by reference.

BACKGROUND

Described below is a method of controlling noise rise in a cell, in particular for $3^{rd}$ generation wireless communication systems, such as 3rd generation partnership project (3GPP) frequency division duplex (FDD) or time division duplex (TDD), but is also applicable to any wireless communication system operating enhanced uplink.

In order to control a number of mobile stations, known as user equipment (UE), in a cell operating enhanced dedicated channel (E-DCH) or enhanced uplink, it is necessary to take measurements at a base station, or Node B, serving those UEs to see how much noise the UEs contribute at the Node B when using E-DCH.

SUMMARY

A method of controlling noise rise in a cell involves setting a maximum noise rise for a cell; allocating maximum noise rise for each mobile station within the cell; measuring at a base station the actual noise rise from each mobile station within the cell; and signalling the measured noise rise at the base station to a network; wherein the cell is operating enhanced dedicated channel (E-DCH). Furthermore, the contribution to noise rise of E-DCH signalling is determined by measuring received signal code power (RSCP) at the base station; decoding the RSCP measurement to determine contributions from mobile stations within and outside the cell; and calculating noise contributions from mobile stations within the cell. Finally, the network is notified of the measured noise rise.

To determine how much of the noise rise is due to E-DCH, a digital domain measurement of RSCP is made. Such a measurement is defined in the standard for 3GPP FDD, but was designed for determining signal to interference ratio (SIR). Using this measurement allows each node B to inform the network of the measured noise rise due to mobile stations within the cell, or noise rise that other cells are producing, so that the network can ensure that there is no undue interference with the operation of other base stations and their associated UEs. The measured noise rise is a change in value and having measured this change, it is used in the signalling method.

In an embodiment, the network is notified of the amount of noise at the base station due to E-DCH, the amount due to legacy channels and the amount due to other cells.

In an embodiment, the method further includes applying a compensation value to compensate for temperature induced noise.

Certain assumptions are made about the behavior of the receiver of the Node B. However, receiver behavior can change with time and temperature, for example if there is a significant difference between day and night time operating temperatures. As the receiver heats up, then noise measurements may change, so it is desirable to apply some compensation for temperature when any in-use measurement of noise is made.

In an embodiment, the compensation value is calculated in advance and stored.

In an embodiment, the store includes a look up table (LUT).

For convenience, compensation values are calculated in advance and stored, e.g. in a look up table (LUT), allowing the variations to be tuned out. Using a look up table in this way improves overall accuracy of the data reported back to the network, so maximizing the number of UEs which can operate at one time, or the data rate available.

In an embodiment, the compensation value includes a factor by which to modify a measurement of received total wideband power (RTWP) taken when no uplink transmissions are taking place.

Without compensation, a ½ dB error in measuring noise at the base station can mean up to 10% drop in cell throughput.

In an embodiment, the base station is a Node B; the mobile station is a user equipment (UE); and the network is a radio network controller (RNC).

In an embodiment, the cell is part of a third generation communication system.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 3 is a bar graph illustrating how maximum noise rise can be broken down into its constituent components.

DETAILED DESCRIPTION OF THE PREFERRED EMBODIMENT

Figure 1:
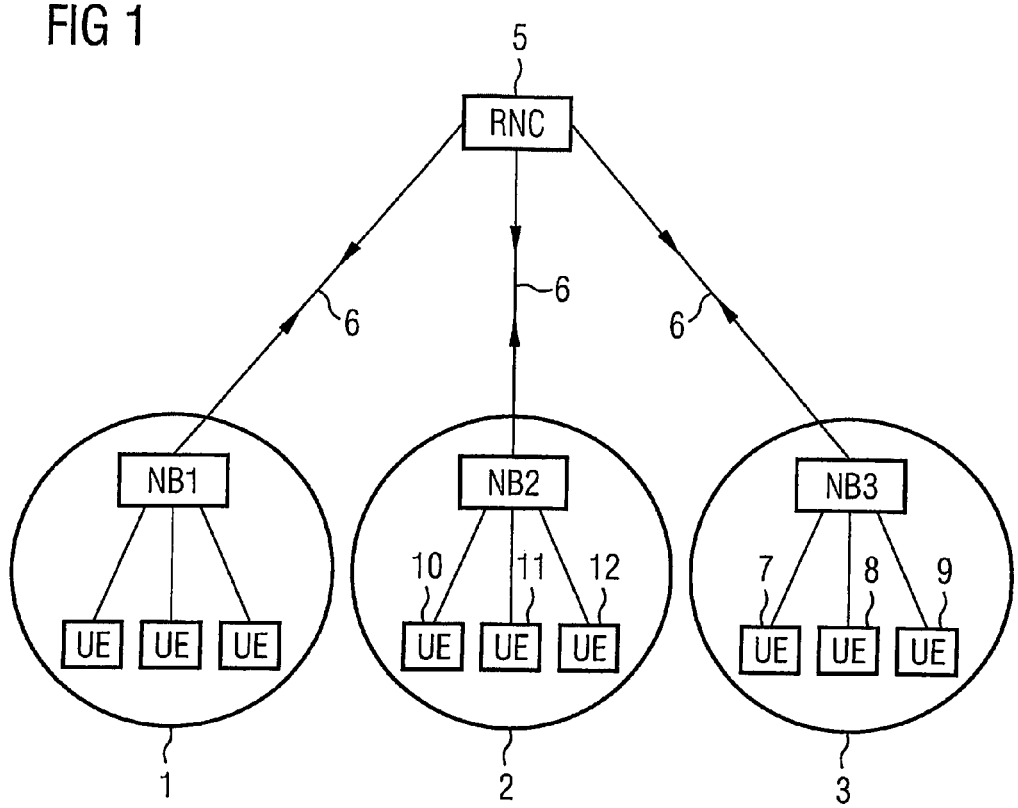
FIG. 1 is a block diagram illustrating a typical network arrangement in which the method is applied.

Reference will now be made in detail to the preferred embodiments, examples of which are illustrated in the accompanying drawings, wherein like reference numerals refer to like elements throughout.

There have been discussions in connection with 3GPP frequency division duplex (FDD) enhanced dedicated channel, or enhanced uplink (E-DCH) relating to how radio resource management (RRM) for uplink (UL) resources and the corresponding scheduling of E-DCH resources in the network can be improved. The proposals consider measurements by a radio network controller (RNC).

E-DCH is a packet oriented uplink channel especially suited for high data rates and bursty transmission. The received power used by user equipments (UEs) in the uplink is managed by a base station (BS) in order to improve utilization of uplink noise rise. However since the network is responsible for overall RRM, including legacy channels, noise rise in the BS receiver needs to be carefully controlled by the network. Radio resource management is a method whereby the network controls how many UEs come into a Node B. Noise contributed by each UE is measured, so that the network can determine if the number of UEs in a cell is at its maximum, or whether it can be increased, or whether the data rate of existing UEs in the cell can be increased.

FIG. 1 shows a typical arrangement of cells 1, 2, 3 in a network 4 controlled by an RNC 5. The RNC sends instructions via radio network links 6 to each node B NB1, NB2, NB3 setting limits of maximum noise rise. Each Node B then subdivides the available noise rise in a known manner and signals to each UE 7, 8, 9 (and 10, 11, 12) the maximum which is available to it.

Figure 2:
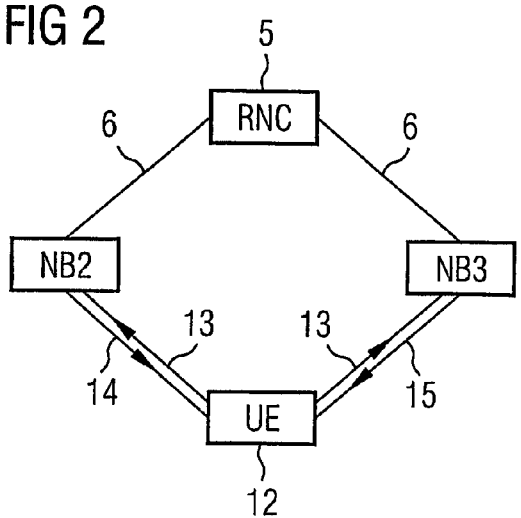
FIG. 2 is a block diagram illustrating in more detail the communications between the components of FIG. 1.

FIG. 2 illustrates how one UE 12 can have an impact on the noise at more than one node B NB2, NB3. E-DCH transmissions 13 from the UE are received at both NB2, its serving node B and a non-serving node NB3. The serving node B can send absolute grants 14 and relative grants and the non-serving node B sends relative grants 15. The RNC communicates the maximum noise rise to each Node B. Although, UE 12 is not served by NB3, its position is such that it can interfere with UEs served by NB2, so the RNC needs to be able to control this effect.

FIG. 3 illustrates how different types of noise make up the noise rise at a node B. For all node Bs there is a certain amount of noise whose source is unknown and which cannot be compensated for. This unknown noise 16 is the minimum. Added to this is an amount of noise caused by the receiver itself, e.g. due to the components 17. Noise produced due to communication can be broken down into noise from other cells 18, noise 19 from other channels communicating via the node B which are not operating enhanced uplink; and noise 20 at the node B caused by its served UEs operating E-DCH. As described in more detail below, the method allows a received total wideband power value to be determined for each of the operating noise types, 18, 19, 20. An additional variable is that at different ambient temperatures the component noise 17 will vary. It will be least at the daily minimum and usually greatest at the daily maximum. The increase in this noise 17 is indicated by the dotted line 21. The maximum permitted noise rise in the cell is indicted by the level 22. To optimize efficiency, it is desirable to get as close to this level without exceeding it.

In order to effectively manage overall RRM, it is necessary for the RNC to be able to set targets for the BS for the uplink resources that it manages and monitor the usage of these resources (noise rise) by the BS. Currently the only suitable measurement in this area is received total wideband power (RTWP) at the BS receiver. RTWP measures uplink interference and so can be used to determine the overall noise rise if the noise level at the BS is known. RTWP measured at an antenna is analog and takes into account the receiver behavior. RTWP is measured in a quiet period with no 3G transmissions, so only hardware or random other noise outside the control of the node B is measured. The measured quiet RTWP is either stored at the Node B or returned to the RNC to give a basic level of noise from which to calculate the E-DCH generated noise.

Examples of determination of the optimum quiet period t0 based on statistical cell traffic analysis are described below. The phase of low traffic activity within one day can be determined by analyzing the cell traffic of an example cell, cell X and other cells close to cell X for a number of days. This can be analyzed in the RNC. This analysis provides a time dependent probability for low traffic activity on a cell basis in terms of a time window where the probability for low traffic activity is the lowest for cell X and the surrounding cells. The optimal time t0 within this time window is either when there is no traffic in cell X, by setting a threshold, or at a time when the traffic is predicted to be lowest based on the statistics. The time t0 can be signalled from the RNC to the Node B, alternatively the RNC signals only the time window and the Node B decides t0 within this time window autonomously.

To determine the noise rise share of E-DCH users, a sum of received signal code power (RSCP) of all UEs using E-DCH is determined. RSCP in the Node B is not defined as a measurement in the standard, but such a determination of the code power can be easily done in the digital domain node B, since the signal to interference ratio (SIR) measurement also requires this functionality. Knowledge of corresponding scrambling and spreading codes that are used is required. RSCP is a digital measurement, from which after decoding channels, the node B knows all transmission power levels and where they are from. The UE from which these come may or may not be served by that node B.

In order to compensate errors when referencing such an RSCP value to the antenna connector, e.g. due to RF gain variations, this is a relative measurement.

$$\frac{E\text{-}DCH \text{ noise}}{\text{total uplink noise}} = \frac{\text{sum of all } E\text{-}DCH \text{ } RSCP \text{ in cell } X}{RTWP \text{ in cell } X}$$

(note: this is a linear description, in dB it would be a difference)

Such a measurement reported from a node B to an RNC allows determination of the share of the sum of all Enhanced UL (E-DCH) channels from other cells (for which cell X is called non-serving cell); and other intra cell interference in cell X (e.g. RACH or HS-DPCCH in cell X) to the total UL noise. As the sum of all Enhanced UL (E-DCH) channels for which cell X is the serving cell and the sum of all Enhanced UL (E-DCH) channels from other cells (for which cell X is called non-serving cell) are controlled by cell X in a different way, the former, serving cell is controlled by Absolute Grant (AG) or Relative Grant (RG) up/hold/down commands, and the latter, non-serving cell is controlled only by RG down/hold command, then these noise types can also be further distinguished into:

$$\frac{\text{served } E\text{-}DCH}{\text{total } UL \text{ noise}} = \frac{\text{sum of all } E\text{-}DCH \text{ } RSCP \text{ where cell } X \text{ is the serving } cellU}{RTWP \text{ in cell } X}$$

$$\frac{\text{non-served } E\text{-}DCH}{\text{total } UL \text{ noise}} = \frac{\text{sum of all } E\text{-}DCH \text{ } RSCP \text{ where cell } X \text{ is NOT the serving cell}}{RTWP \text{ in cell } X}$$

This allows an even more detailed control of the UL interference caused by E-DCH and such information can be used in the node B scheduler as well as in the admission control by the RNC.

It is also possible to calculate and report to the RNC for a finer admission control the ratio of:

$$\frac{\text{sum of } RSCPs \text{ of dedicated channels}}{\text{total } RTWP \text{ in the cell}}$$

Measurement of RSCP applies more overall accuracy to control the noise rise by taking into account the type of use of each UE.

In an active cell, an increase in noise occurs when physical receiver characteristics change due to variation in ambient temperature, e.g. at a different time of day. In some places temperatures may vary significantly between night and day, such as from 2° C. to 40° C. A further feature provides a method of dealing with these temperature induced changes, by measuring the temperature at the node B when the later measurement is made and using a LUT to determine how characteristics change due to temperature, a correction is applied to improve the accuracy of the total noise measurement. This method can be used in conjunction with the RSCP measurements, or separately.

It is necessary to know how much E-DCH alone contributes to the measured differential, rather than from other cells in the vicinity. Conventionally, it has not been possible to determine an indication of the share of interference or noise rise resulting from E-DCH transmissions compared to that used for other transmissions such as legacy dedicated channel (DCH), forward access channel (FACH) etc., although, this can be done using RSCP as described above. A scheduler in the Node B determines the available noise rise for all UEs and allocates a local maximum for each. Transmission at a higher data rate means more noise, so fewer UEs can transmit. The Node B allocates to the UE a maximum data rate that it can used and from this it is possible to determine the noise that this data rate will create at the Node B), so the node B must measure the actual noise correctly to keep within the allocated maximum.

In a known system, the RNC can command that a certain portion of the noise rise (target noise rise) be used by the scheduler for E-DCH noise rise at the BS, or Node B receiver, but the Node B has no way of informing the RNC about the actual status, i.e. the noise rise in the BS receiver caused by E-DCH users which it serves, or E-DCH users in other cells. In this case, the expression "users in other cells" includes users sending their data to a different Node B, but receiving relative grants from the same Node B. Therefore the RRM control mechanism available to the RNC is at best open loop, which is unlikely to be sufficient in a real network. The node B needs to measure all noise contributions and the RNC signals an upper limit which is the maximum uplink noise permitted. If the node B exceeds this maximum, the performance and throughput will deteriorate and at worst the whole cell will cease to operate. The RNC must tell each Node B the maximum noise rise it can use and send a limit and then the Node B must measure the actual noise rise against this limit and tell the RNC. In all cells there is background noise and the node B needs to know what the background noise is, so it can determine the amount by which it changes in busy times.

An absolute value for this purpose (e.g. absolute interference at the BS receiver) is not suitable, as E-DCH caused RTWP does not exist as such and such an absolute value would be of no use. An absolute value would not indicate noise rise to the RNC and the value would be determined in the base band and needs to be referenced to the antenna connector, thus containing inaccuracy due to the receiver gain in the receive chain.

Current total RTWP power measurement has an error of +/−4 dB absolute accuracy which cannot be significantly improved. An error of 0.5 dB in the UL noise rise estimation will cause an E-DCH throughput loss of about 10% and a 3 dB error leads to a loss in the order of 50%. Similar figures could be expected for any RRM based on absolute interference measurements, so a better solution is required.

There is also a relative accuracy defined for RTWP: +/−0.5 dB. "Relative accuracy" refers to the allowed difference between two measurements of RTWP made at different points in time arising from measurement inaccuracy; however the time between these two RTWP measurements is not explicitly specified in 3GPP release 6.

One way to obtain a noise rise measurement, including a component which takes into account the interference from other cells, with a relative accuracy of 0.5 dB, rather than the absolute accuracy of 4 dB would be to measure the Node B noise power by taking an RTWP measurement at a point in time when the entire network is quiet, i.e. when there are no uplink transmissions in any cell, and then during active E-DCH operation to report measured RTWP relative to the quiet period value.

However, taking an RTWP in 'low cell traffic density hours', to get an estimation of the receiver noise and the other parts of interference which can not directly be influenced, as a reference could be a problem in that temperature drift can produce fluctuations in receiver noise of 0.5 dB, for the example of a temperature difference between day and night of 20-30° C. with remote radio heads. Another problem is to determine the time of lowest cell traffic activity as this depends of the deployment, time and other influences.

The node B can only measure the total noise, which includes unknown background noise, temperature induced noise and noise from legacy channels which are not operating E-DCH. In a known system, the RNC controlled how much power each UE could use, which is quite slow and inefficient because of the need to transmit information over a long run. Enhanced uplink passes some of the management function to the node B, thereby reducing signalling delays. However, the node B is not able to control UEs in adjacent cells which might cause interference although it can adjust the maximum power that they use by the relative grant, so the RNC still has a role and a need to determine the noise actually generated at each node B to ensure that one cell does not interfere with another. If the Node B scheduler is not doing too well, the RNC will tell the node B to reduce its noise. The Node B does not know what other node Bs are doing so RNC controls to make sure other Node Bs are not interfered with.

The method enables a practical BS measurement that is useful for RRM, has reasonable accuracy and reflects the proportion of uplink resources used for E-DCH RTWP received from cell X can be considered as a sum of:
(a) receiver noise caused by a receiver in Node B for cell X;
(b) inter-cell interference from other cells close to cell X (as long as not covered below);
(c) the sum of all UL dedicated channels (UL DPCH) of cell X;
(d) the sum of all Enhanced UL (E-DCH) channels for which cell X is the serving cell;
(e) the sum of all Enhanced UL (E-DCH) channels from other cells (for which cell X is called non-serving cell); and
(f) other intra cell interference in cell X (e.g. RACH or HS-DPCCH in cell X)

A measurement $RTWP\_1$ at time instant t1 relative to $RTWP\_0$ at t0 where t1 is the time instant at which the UL noise should be controlled in an active network and t0 is a phase of low traffic activity in the network, means that it is possible to get an impression of how the parts c, d, e and f contribute to the UL noise rise ($RTWP\_1/RTWP\_0$).

In such a case $RTWP\_0$ could either be stored in the Node B or provided by the RNC via Iub signalling, indicating that this is to be used as a basis for the control of the total noise rise. The relative RTWP measurement has the advantage of higher accuracy as systematic errors (e.g. for RF gain variations when referring to the antenna connector) for both RTWP parts cancel each other for the quotient.

Drawbacks of the "quiet period" measurement must be overcome. Considering a reference $RTWP\_0$ which is taken in the low activity hours, during which only (a) and (b) are relevant, the temperature drift of the receiver noise (a) can be improved by having a stored reference for receiver noise, i.e. a table dependent on temperature which may be provided for example in the Node B, in the RNC, or provided by OMC.

Such a look up table can be e.g. noise figure as a function of temperature at the receiver and this can be either stored in the Node B or stored in the RNC or provided to Node B or RNC via operation & maintenance (O&M).

Assuming RTWP_0 (T0, t0) is measured where T0 is the temperature at the receiver at the time instant t0 and at a later time t1 where the temperature at the receiver is T1 but it is not possible to measure RTWP_0 at t1 as there is already a higher activity in the cell: In this case the receiver noise for T0 could be subtracted from the RTWP_0 value at t0 (based on the table) and a corresponding correction for T1 could be added (also dependent on the table) as soon as T0 and T1 are known.

Although this does not deal with the problem that the inter cell interference (b) at t0 and t1 might not be identical, it improves the temperature drift of the receiver noise (a).

The look up table can be made dependent on further parameters which influence the receiver noise. The more parameters that are included, the more desirable it is to keep the table in the Node B, as otherwise these parameters need to be signalled to the RNC too, removing some of the benefits of operating E-DCH. The optimal time t0 can be determined by statistical analysis of the cell traffic in cell X and the other cells close to cell X, as described above.

Taken alone, such an improved measurement gives a more accurate idea of the noise rise level and in combination with measuring the share of the noise rise occupied by E-DCH users, significantly improves efficiency. The control of UL noise rise is based on the assumption that the RNC provides a target value and the Node B measures corresponding quantities and the Node B reports them back to the RNC (in a filtered way) and/or uses them for its own scheduler. With the measurement improvements described above, a finer control of the UL noise rise is possible which improves the cell capacity, the interference control and the performance at the cell edge. The overall noise rise report using RTWP is improved by a temperature dependent lookup table and an indication of noise rise share is provided using relative RSCP measurements.

The system also includes permanent or removable storage, such as magnetic and optical discs, RAM, ROM, etc. on which the process and data structures of the method can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method of reporting noise rise in a cell using enhanced dedicated channel operation, the method comprising:
   setting a maximum noise rise for a cell;
   allocating the maximum noise rise among each mobile station within the cell;
   measuring, at a base station, actual noise rise from each mobile station within the cell;
   measuring received signal code power at the base station;
   decoding the received signal code power measurement to determine contributions thereof from mobile stations within and outside the cell;
   calculating noise contributions from mobile stations within the cell;
   determining a measured noise rise due to only enhanced dedicated channel transmissions; and
   notifying a network of the actual noise rise at the base station and the measured noise rise due to only enhanced dedicated channel transmissions.

2. A method according to claim 1, further comprising determining at the base station and notifying the network of an amount of noise at the base station due to legacy channel transmissions and due to other cells.

3. A method according to claim 1, further comprising applying a compensation value to compensate for temperature induced changes in noise.

4. A method according to claim 3, wherein the compensation value is calculated in advance and stored.

5. A method according to claim 4, wherein a plurality of compensation values are stored in a look up table.

6. A method according to claim 3, wherein the compensation value includes a factor by which to modify a measurement of received total wideband power taken when no uplink transmissions are taking place.

7. A method according to claim 6, wherein the base station is a Node B; the mobile station is user equipment; and the network includes a radio network controller.

8. A method according to claim 7, wherein the cell is part of a third generation communication system.

9. A method of controlling noise rise in a cell using enhanced dedicated channel operation, comprising:
   setting a maximum noise rise for a cell;
   allocating the maximum noise rise among each mobile station within the cell;
   measuring, at a base station, an actual noise rise from each mobile station within the cell;
   signalling the actual noise rise at the base station to a network;
   determining a contribution to noise rise due to only enhanced dedicated channel transmissions; and
   applying a compensation value to compensate for temperature induced changes in noise.

10. A method according to claim 9, wherein the compensation value is calculated in advance and stored.

11. A method according to claim 10, wherein a plurality of compensation values are stored in a look up table.

12. A method according to claim 9, wherein the compensation value includes a factor by which to modify a measurement of received total wideband power taken when no uplink transmissions are taking place.

13. A method of determining a rise in power or noise attributed to enhanced dedicated channel transmissions comprising:
   measuring, by a base station, a received total wideband power for a cell;
   measuring, by the base station, a sum of received signal code power contributions only for enhanced dedicated channel transmissions from one or more mobile stations;
   determining, by the base station based on the received total wideband power and the sum of the received signal code power contributions, a share of increased power for the cell attributed to only the enhanced dedicated channel transmissions; and
   notifying a network of the received total wideband power for the cell and the determined share of increased power for the cell attributed to the enhanced dedicated channel transmissions.

14. A method according to claim 13, wherein the measuring the received total wideband power comprises:

measuring, by the base station, a received total wideband power for a cell received by the base station during a quiet period when one or more mobile stations are not transmitting.

15. A method according to claim 13, wherein the determining comprises:
    determining, by the base station, a share of increased power for the cell attributed to only the enhanced dedicated channel signals according to the following:
    the increased power attributed to only the enhanced dedicated channel signals=the sum of the received signal code power contributions/the received total wideband power.

16. A network node operating a cell of a wireless communication system, the network node configured to:
    measure, by the base station, a received total wideband power for a cell;
    measure, by the base station, a sum of received signal code power contributions only for enhanced dedicated channel transmissions from one or more mobile stations;
    determine, by the base station based on the received total wideband power and the sum of the received signal code power contributions, a share of increased power for the cell attributed to only the enhanced dedicated channel transmissions; and
    notify a network of the received total wideband power for the cell and the determined share of increased power for the cell attributed to only the enhanced dedicated channel transmissions.

* * * * *